United States Patent [19]

Ueno et al.

[11] Patent Number: 5,448,627
[45] Date of Patent: * Sep. 5, 1995

[54] TELEPHONE APPARATUS WITH CALL FORWARDING ARRANGEMENT

[75] Inventors: Hiroatsu Ueno, Chikushino; Yasuhiro Sakaime, Tosu, both of Japan

[73] Assignee: Matsushita Electric Industrial Co., Ltd., Osaka, Japan

[*] Notice: The portion of the term of this patent subsequent to Feb. 22, 2011 has been disclaimed.

[21] Appl. No.: 177,824

[22] Filed: Jan. 5, 1994

Related U.S. Application Data

[62] Division of Ser. No. 836,576, Feb. 18, 1992, Pat. No. 5,289,528.

[30] Foreign Application Priority Data

Feb. 18, 1991 [JP] Japan .................. 3-023372

[51] Int. Cl.$^6$ ............... H04M 1/64; H04M 1/66
[52] U.S. Cl. ........................ 379/67; 379/88; 379/211; 379/212; 379/142
[58] Field of Search ............. 379/67, 88, 89, 211, 379/212, 142

[56] References Cited

U.S. PATENT DOCUMENTS

| | | | |
|---|---|---|---|
| 4,893,336 | 1/1990 | Wuthnow | 379/211 |
| 4,942,598 | 7/1990 | Davis | 379/142 |
| 5,023,868 | 6/1991 | Davidson et al. | 379/94 |
| 5,289,528 | 2/1994 | Ueno et al. | 379/211 |

Primary Examiner—James L. Dwyer
Assistant Examiner—Fan Tsang
Attorney, Agent, or Firm—Pollock, Vande Sande & Priddy

[57] ABSTRACT

The automatic telephone answering apparatus of this invention is capable of connection to a plurality of telephone lines. The user registers in this apparatus the telephone number of a telephone equipment where the user will be staying (destination telephone number) and telephone numbers of desired calls. This apparatus detects the telephone number data indicative of the caller's telephone sent from an exchange. When the detected telephone number data agrees with the registered object telephone number, this apparatus automatically calls the telephone of the destination using the registered destination telephone number. If this automatic call succeeds, this apparatus connects the being called telephone line to the telephone line automatically called by the automatic telephone answering apparatus. Therefore, an important call is directly transferred to the user staying at another place, so that the user can directly communicate with the important caller. In addition, the frequency of response to the transferred calls is reduced because the transferred calls are limited to only calls from telephones whose telephone numbers have been registered previously.

6 Claims, 4 Drawing Sheets

TELEPHONE APPARATUS WITH CALL FORWARDING ARRANGEMENT

This is a divisional of application Ser. No. 836,576, filed on Feb. 18, 1992 now U.S. Pat. No. 5,289,528.

BACKGROUND OF THE INVENTION

1. Field of the Invention

This invention relates to an automatic telephone answering apparatus using the telephone number data of a caller sent from an exchange.

2. Description of the Prior Art

A system is known which sends a caller's telephone number to a subscriber's terminal together with a ring signal from an exchange. Therefore, the subscriber can know who is calling before his response.

Moreover, a telephone terminal is generally known which comprises a plurality of communication interface circuits for communicating with a plurality of telephone lines respectively. This telephone terminal can individually communicate with each line.

Further, an automatic telephone answering apparatus is known which is capable of transferring a message. This transferring function is as follows:

The automatic telephone answering apparatus records an incoming message (ICM) received from a caller in the absence of the called subscriber or user and then transfers the recorded message to a registered transfer destination by automatic dialing, reproducing, and sending the recorded message through the same telephone line. This function enables the called user to know who was called him and what the caller said at a place where he is staying.

As mentioned above, the prior art automatic telephone answering apparatus with the message transferring function records an incoming message from the caller when there is a call in the absence of the called user; calls a telephone of which a telephone number is registered, that is, a destination telephone number, after recording of the caller's message; and then reproduces and sends the recorded incoming message to a telephone at the destination. This operation is performed for each of the calls.

However, there is a problem that the telephone lines of the automatic telephone answering apparatus and the telephone of destination will be busy if calls are relatively frequent because all massages are transferred to the transfer destination. Moreover, because all messages are sent to the destination where the user is staying, a message which includes no urgent matter will be also transferred. Thus, if the user is very busy because of business, such indiscriminate transferring would interfere with his business.

SUMMARY OF THE INVENTION

The present invention has been developed in order to remove the above-described drawbacks inherent to the conventional automatic telephone answering apparatus.

The automatic telephone answering apparatus of this invention is capable of connection to a plurality of telephone lines. The user registers in the automatic telephone answering apparatus a telephone number of a telephone equipment where the user will be staying (destination telephone number) and telephone numbers of desired calls. The automatic telephone answering apparatus detects telephone number data of the caller sent from an exchange. When the detected telephone number data agrees with the registered object telephone number, the automatic telephone answering apparatus automatically calls the destination telephone using the registered destination telephone number. Therefore, an important call is transferred to the user staying at another place, so that the user can directly communicate with the important caller. In addition, the frequency of response to the transferred calls is reduced because the transferred calls are limited to only calls from those telephones whose telephone numbers have been registered previously.

According to the present invention there is provided a first automatic telephone answering apparatus comprising: N communication interface circuits for communicating with N telephone lines, respectively, wherein N is a natural number and is more than one; a telephone number detection circuit for detecting telephone number data indicative of a caller's telephone through one of N telephone lines; a first memory area for storing a first telephone number; a second memory area for storing a second telephone number; a comparing circuit for comparing the detected telephone number data with the first telephone number; a control circuit for communicating with one other telephone line of N telephone lines when the telephone number data is agreed with the first telephone number; a dialing circuit for performing dialing using the second telephone number through one other telephone line; and a connection circuit for forming communication passage between one of N telephone lines and one other telephone line.

According to the present invention there is also provided a second automatic telephone answering apparatus as mentioned in the first automatic telephone answering apparatus, further comprising: a message storing circuit for storing a message; a busy signal detection circuit for detecting a busy signal sent from the one other telephone line in response to the dialing by the dialing circuit; and a second control circuit for sending the message to the caller through one of N telephone lines.

According to the present invention there is further provided a third automatic telephone answering apparatus as mentioned in the first automatic telephone answering apparatus, further comprising: a message storing circuit for storing a message; a fist detection circuit for detecting a busy signal sent from the one other telephone line in response to the dialing by the dialing circuit; a second detection circuit for detecting a ring back signal sent from the one other telephone line in response to the dialing by the dialing circuit; a timer responsive to the dialing for producing a delay signal whose delay time is predetermined; a second control circuit responsive to the first and second detection circuit and the delay signal for sending the message to the caller through the one of N telephone lines when the first detection circuit does not detect the busy signal and the second detection circuit does not detect the ring back signal during the delay time.

According to the present invention there is provided a fourth automatic telephone answering apparatus comprising: N telephone units for communicating with N telephone lines respectively wherein N is a natural number and is more than one, each of the N telephone units having: a communication interface circuit responsive to a communication control signal for communicating with one of the N telephone lines; a ring signal detection circuit for detecting a ring signal from one of the N telephone lines; a telephone number detection circuit for detecting a telephone number data accompanied with the ring signal through one of the N telephone lines in response to detection of the detected ring signal; a dialing circuit for dialing in response to a dialing control signal; a first memory area for storing a first telephone number; a second memory area for storing a second telephone number; a comparing circuit for comparing the detected telephone number data detected from one of the N telephone lines by the telephone number detection circuit of one of the N telephone units with the first telephone number; a control circuit for communicating with one other telephone line of the N telephone lines using one other telephone unit of the N telephone units by producing the communication control signal and then producing the dialing control signal indicative of the second telephone number when the detected telephone number is agreed with the first telephone number; and a connection circuit for forming communication passage between one of the N telephone lines and the one other telephone line.

According to the present invention there is also provided a fifth automatic telephone answering apparatus as mentioned in the fourth automatic telephone answering apparatus, wherein each telephone unit further comprises a termination detection circuit responsive to an output of the communication interface circuit of the same telephone unit for detecting termination of communication of the communication interface circuit with the one of N telephone lines, the automatic telephone answering apparatus further comprising: a termination control circuit responsive to outputs of N termination detection circuit for disconnecting the communication passage when either of the N termination detection circuit detects termination of communication.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Figure 1:
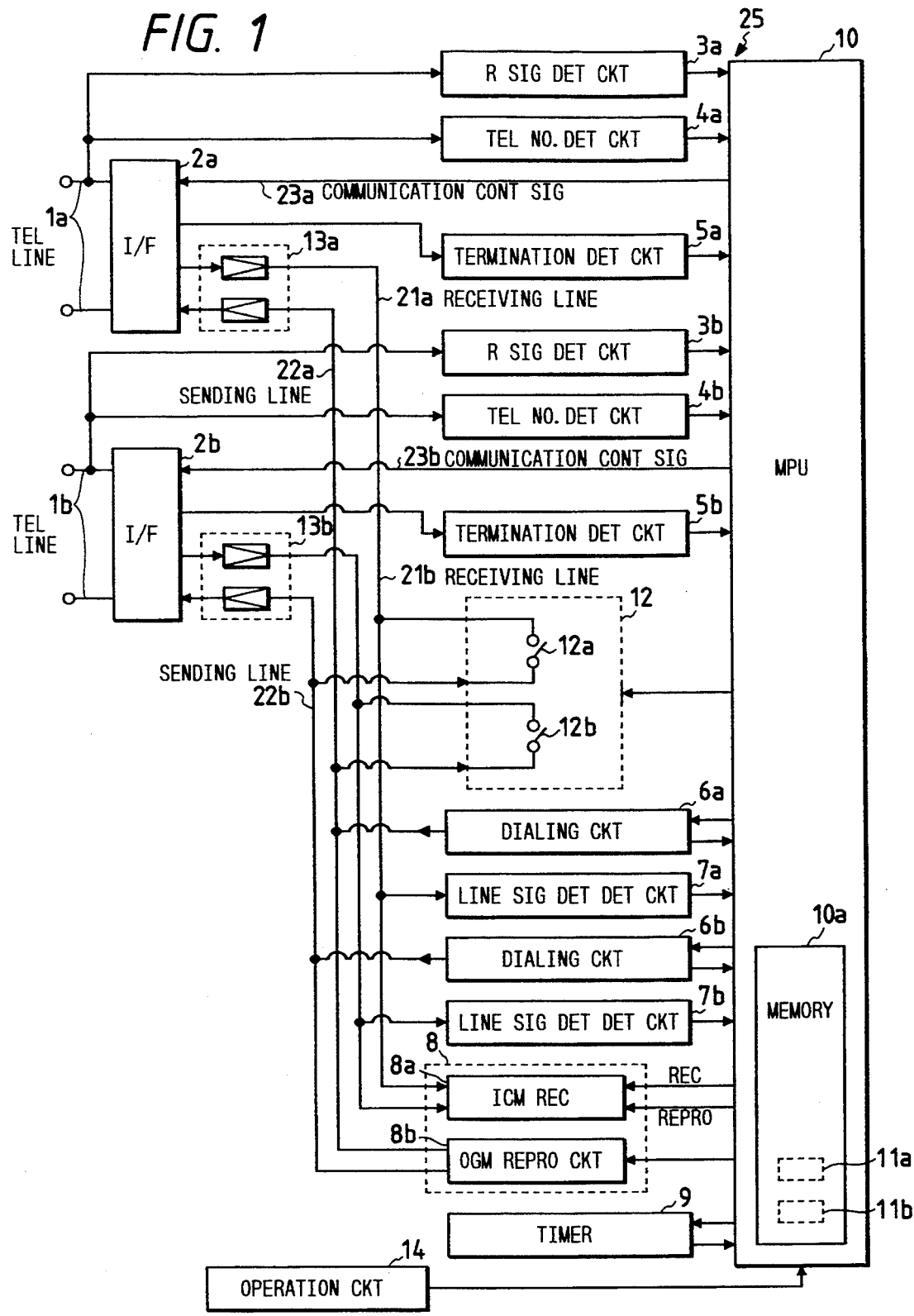
FIG. 1 is a block diagram of the embodiment of this invention of an automatic telephone answering apparatus.
Figure 2:
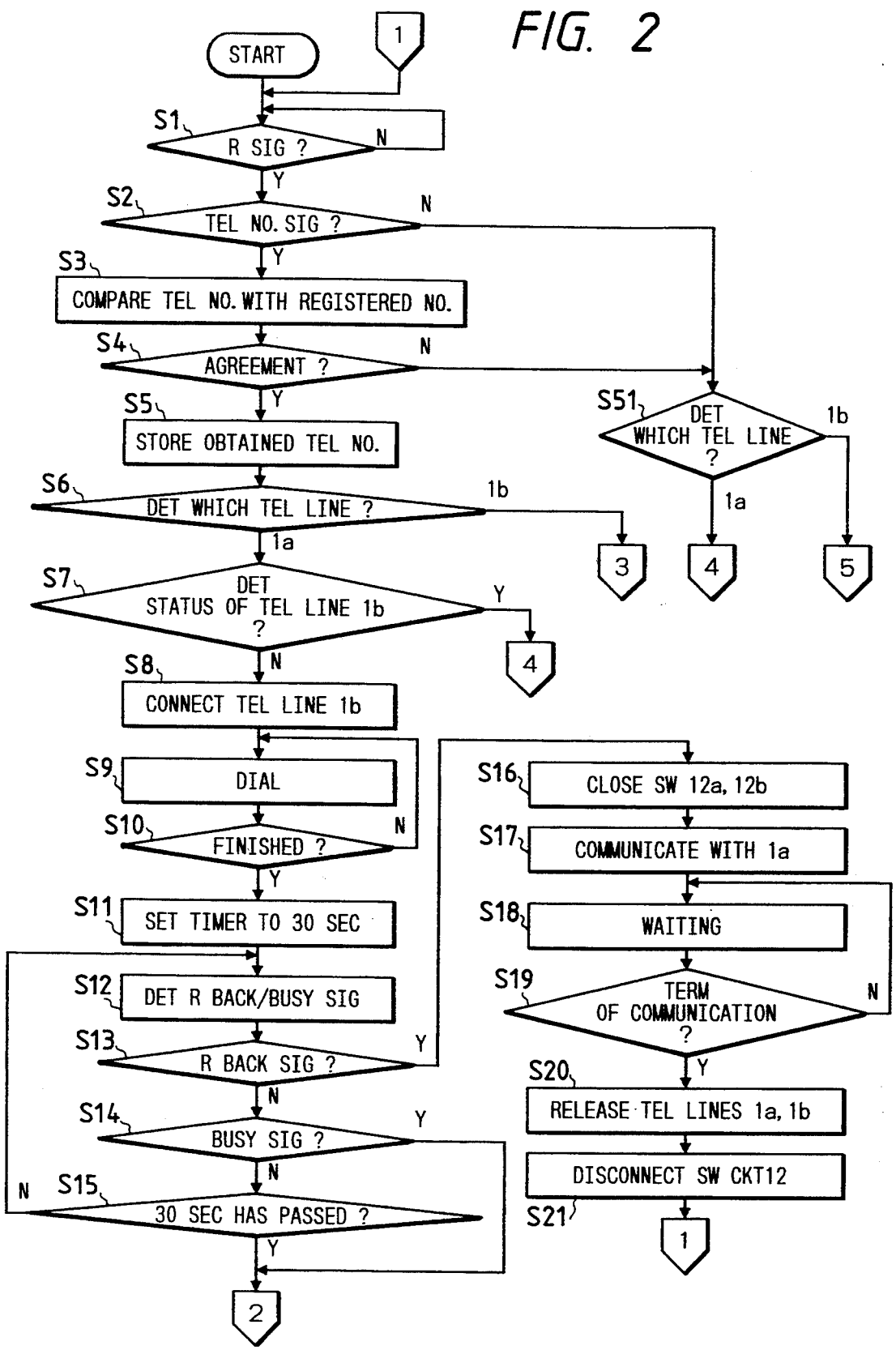
FIGS. 2 and 3 show flow charts of this embodiment.
Figure 3:
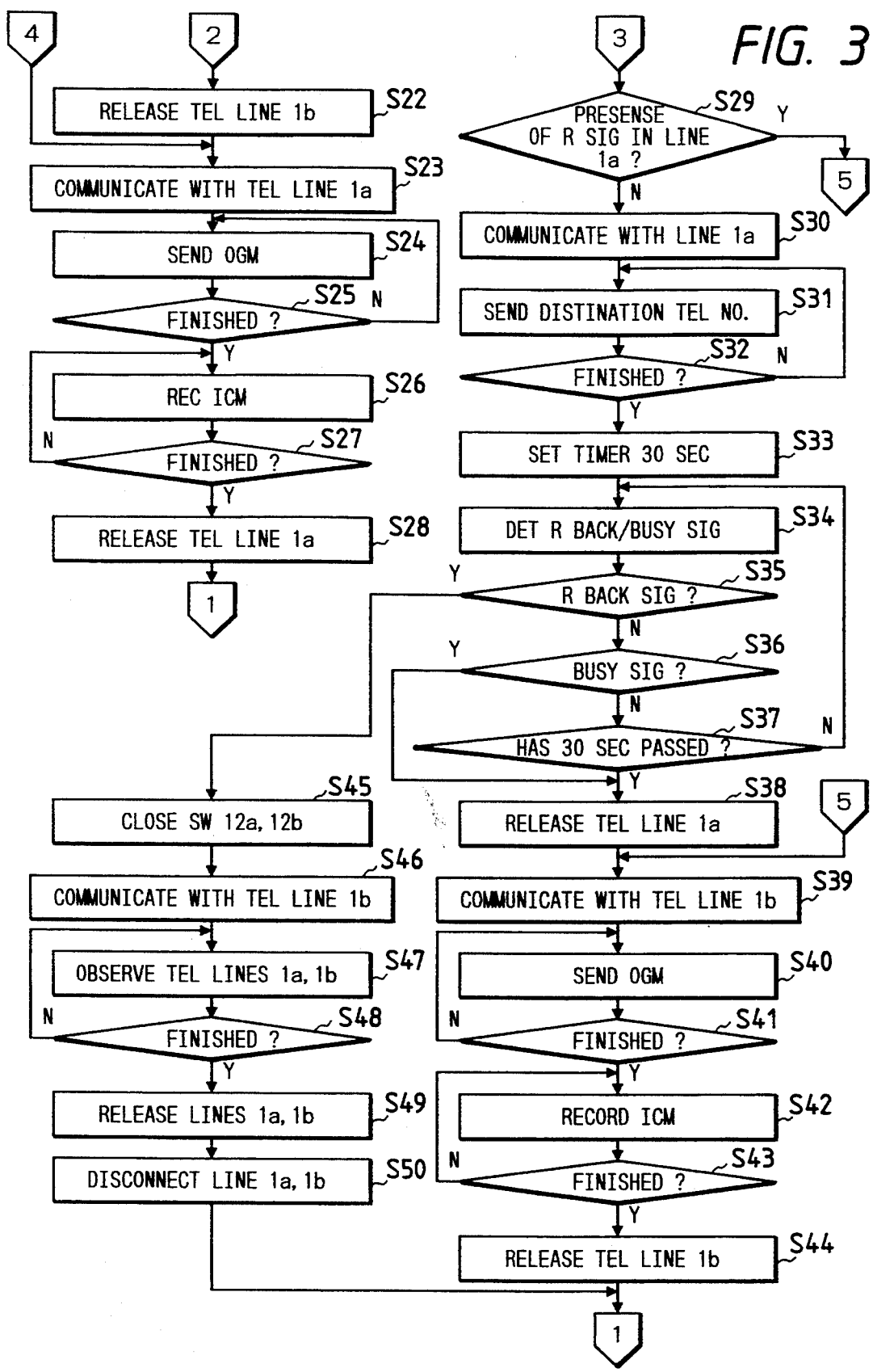

Hereinbelow will be described an embodiment of this invention. FIG. 1 is a block diagram of the embodiment of this invention of an automatic telephone answering apparatus. FIGS. 2 and 3 show flow charts of this embodiment.

In FIG. 1, the automatic telephone answering apparatus 25 of this embodiment is connected to telephone lines 1a and 1b. Therefore, it can communicate with telephone lines 1a and 1b individually. A ring signal detection circuit 3a connected to the telephone line 1a detects a ring signal to send a ring signal detection signal to a microprocessor 10 (MPU) as control means. A telephone number detection circuit 4a connected to the telephone line 1a detects telephone number data sent from an exchange together with the ring signal to send a detected telephone number data to the microprocessor 10. The telephone line 1a is also connected to an well-known interface circuit 2a. The interface circuit 2a performs communication with the telephone line 1a in response to a communication control signal 23a from the microprocessor 10. The interface circuit 2a sends a sound signal from the telephone line 1a to a line signal detection circuit 7a and to a recording/reproducing device 8 through a receiving line via an amplifying circuit 13a in response to the communication control signal 23a. In addition, it sends another sound signal through a sending line 22a from, for example, the recording/reproducing device 8. The interface circuit 2a produces a signal indicative of termination of communication which is sent to a termination detection circuit 5a. The termination detection circuit 5a detects a termination of communication between the telephone line 1a and the interface circuit 2a in response to the signal indicative of termination.

A ring signal detection circuit 3b connected to the telephone line 1b detects a ring signal to send a ring signal detection signal to the microprocessor 10. A telephone number detection circuit 4b connected to the telephone line 1b detects a telephone number data sent from an exchange together with the ring signal to send a detected telephone number data to the microprocessor 10. The telephone line 1b is also connected to an well-known interface circuit 2b. The interface circuit 2b performs communication with the telephone line 1b in response to a communication control signal 23b from the microprocessor 10. The interface circuit 2b sends a sound signal from the telephone line 1b to a line signal detection circuit 7b and to a recording/reproducing device 8 through a receiving line via an amplifying circuit 13b in response to the communication control signal 23b. In addition, it sends another sound signal through a sending line 22b from, for example, the recording/reproducing device 8. The interface circuit 2b produces a signal indicative of termination of communication which is sent to a termination detection circuit 5b. The termination detection circuit 5b detects a termination of communication between the telephone line 1b and the interface circuit 2b in response to the signal indicative of termination.

The recording/reproducing device 8 comprises an incoming recording/reproducing circuit (ICM recording circuit) 8a for recording an incoming message from the interface circuit 2a in response to a record control signal from the microprocessor 10 and an out-going message (OGM) sending circuit 8b for sending a recorded out-going message to the interface circuit 2a through the amplifying circuit 13a in response to an OGM reproduce control signal from the microprocessor 10.

For example, each of the ICM recording circuit 8a and the OGM sending circuit 8b comprises a recording/reproducing circuit including an IC (integrated circuit) memory, namely a DRAM (dynamic read only memory), with an a/d converter and a d/a converter or a magnetic tape deck.

The ICM recording circuit 8a records an incoming message (ICM) from the interface circuit 2b also in response to the recording control signal from the microprocessor 10. The OGM sending circuit 8b reproduces and sends a recorded out-going message (OGM) to the interface circuit 2b also through the amplifying circuit 13b in response to an OGM reproduce control signal from the microprocessor 10. The ICM recording circuit 8a reproduces a recorded massage and sends it to the interface 2a or 2b in response to an ICM reproduce control signal from the microprocessor 10. The ICM recording circuit 8a can selectively record the sound signal from the interface circuits 2a or 2b in response to the ICM record control signal from the microprocessor 10. The OGM sending circuit 8b can selectively send an out-going message to the interface circuits 2a or 2b in response to the OGM reproduce control signal from the microprocessor 10.

A dialing circuit 6a sends a dialing signal to the interface 2a in response to a dialling control signal including telephone number data from the microprocessor 10. The line signal detection circuit 7a detects a ring back signal or a busy signal sent from the telephone line 2a. A dialing circuit 6b sends a dialing signal to the interface 2b in response to a dialing control signal including telephone number data from the microprocessor 10. The line signal detection circuit 7b detects a ring back signal or a busy signal sent from the telephone line 2b. A timer circuit 9 measures a time interval in response to a start signal from the microprocessor 10 for measuring an interval of detection of the ring back signal or the busy signal mentioned above.

The microprocessor 10 executes a stored program whose operation is represented by the flow charts shown in FIGS. 2 and 3. The microprocessor 10 includes a memory 10a therein. The memory 10a stores at least a telephone number of a person whose message is desired to be transferred (hereinafter referred to as an object telephone number) at a memory area 11a and a telephone number of a destination where a massage should be transferred to (hereinafter referred to as a destination telephone number) at a memory area 11b. The user registers one or more telephone numbers at the memory area 11a and a destination telephone number at the memory area 11b through operation of the operation circuit 14.

An operation circuit 14 comprises keys for registering the object telephone numbers and the destination telephone number in the memory 10a and sending circuit (not shown) for sending data of the object telephone numbers, the destination telephone number, and other command signals to the microprocessor 10.

A switching circuit 12 comprises switches 12a and 12b. The switch 12a connects the receiving line 21a where the sound signal is sent from the interface 2a with the sending line 22b where the sound signal is sent to the interface 2b. The switch 12b connects the receiving line 21b where the sound signal is sent from the interface 2b with the sending line 22a where the sound signal is sent to the interface 2a. That is, the switching circuit connects the telephone lines 1a and 1b to each other.

Hereinbelow will be described operation of this embodiment with reference to FIGS. 2 and 3.

The microprocessor 10 executes the stored program represented by flow charts shown in FIGS. 2 and 3.

At first, the user registers a telephone number of a person whose message is desired to be transferred (hereinafter referred to as an object telephone number) and a telephone number of a destination where a message should be transferred to (hereinafter referred to as destination telephone number). The user registers one or more telephone numbers at the memory area 11a and a destination telephone number at the memory area 11b through operation of the operation circuit 14.

In the automatic answering mode, when a ring signal comes from the telephone line 1a or 1b, the ring signal detection circuit 3a or 3b detects it and produces and sends a ring signal detection signal to the microprocessor 10. In step S1 of the flow chart shown in FIG. 2, the microprocessor 10 detects a call by checking the presence of the ring signal detection signal from the ring signal detection circuit 3a or 3b and detects which telephone lines 1a and 1b the ring signal is sent from, by checking which ring signal detection circuits 3a and 3b the ring signal detection signal is sent. It is assumed here that the call comes through the telephone line 1a. The telephone number detection circuit 4a detects telephone number data of an analog signal indicative of the caller's telephone number which are sent for intervals between two consecutive ring signals repeatedly sent. In the following step S2, the microprocessor 10 reads the telephone number data detected by the telephone number detection circuit 4a. If the call comes through the telephone line 1b, the microprocessor 10 detects the telephone number using the telephone number detected circuit 4b. In tills step S2, a decision is made as to whether the telephone number data is retrieved. If NO, processing proceeds to a step S51. If YES, processing proceeds to a step S3. In the succeeding step S3, the microprocessor 10 compares the obtained telephone number data with each of the registered destination telephone numbers stored in the memory 10a.

In the following step S4, a decision is made to determine whether there is agreement of the registered destination telephone numbers with the obtained telephone number. If YES, processing proceeds to a step S5. In the step S5, the microprocessor 10 stores the obtained telephone number in the memory 10a. In the following step S6, the microprocessor 10 detects which telephone line 1a or 2b the call comes from. If the call comes from the telephone line 1b, processing proceeds to step S29. If the call comes from the telephone line 1a, processing proceeds to step S7. As mentioned above, it is assumed that the call comes through the telephone line 1a here.

In the step S7, the microprocessor 10 detects a status of another telephone line, that is, the telephone line 1b. That is, the microprocessor 10 detects whether the telephone line 1b is used or not. For example, the microprocessor 10 detects whether a ring signal is coming from the telephone line 1b and whether a loop current flows there. Up to tills step, the telephone line 1a has not been communicating with the automatic telephone answering apparatus 25.

If the telephone line 1b is not in use, processing proceeds to a step S8. In the step S8, the microprocessor 10 sends the communication control signal 23b to the interface circuit 2b to communicate with the telephone line 1b. In the following step S9, the microprocessor 10 reads the destination telephone number stored at the memory 11b and sends it as part of a dialing control signal to the dialing circuit 6b. The dialing circuit 6b sends the destination telephone number to the telephone line 1b. In the following step S10, the microprocessor 10 detects whether the dialing has finished. If NO, processing loops the steps S9 and S10. If YES, that is, dialing has finished, processing proceeds to a step S11. Then, the microprocessor 10 detects a ring back signal and a busy signal as follows:

In the step S11, the microprocessor 10 sets a given interval, for example, 30 seconds to the timer 9 and starts it. In this embodiment, the interval necessary for detecting the ring back signal and the busy signal is assumed to be 30 seconds. The line signal detection circuit 7b detects the ring back signal and the busy signal, and other line signals, and the detected result is sent to the microprocessor 10. In the step S12, the microprocessor 10 checks the ring back signal and the busy signal sent from the telephone line 1b. In the following step S13, a decision is made to determine whether or not the ring back signal is present. In the presence of the ring back signal, processing proceeds to a step S16.

In time step S16, the microprocessor 10 causes the switching circuit 12 to form a communication passage between the telephone line 1a and the telephone line 1b. That is, the switch 12a connects the receiving line 21a of the telephone line 1a to the sending line 22b of the telephone line 1b and the switch 12b connects the receiving line 21b of the telephone line 1b to the sending line 22a of the telephone line 1a. In the following step S17, the microprocessor 10 causes the interface circuit 2a to communicate with the telephone line 1a. That is, the communication passage is completely formed. In steps S18 and S19, the microprocessor 10 waits termination of communication between the telephone lines 1a and 1b by checking outputs of termination detection circuit 5a and 5b. When the communication has finished, the microprocessor 10 releases the telephone lines 1a and 1b by sending communication control signals 23a and 23b to the interface circuits 2a and 2b.

Figure 4:
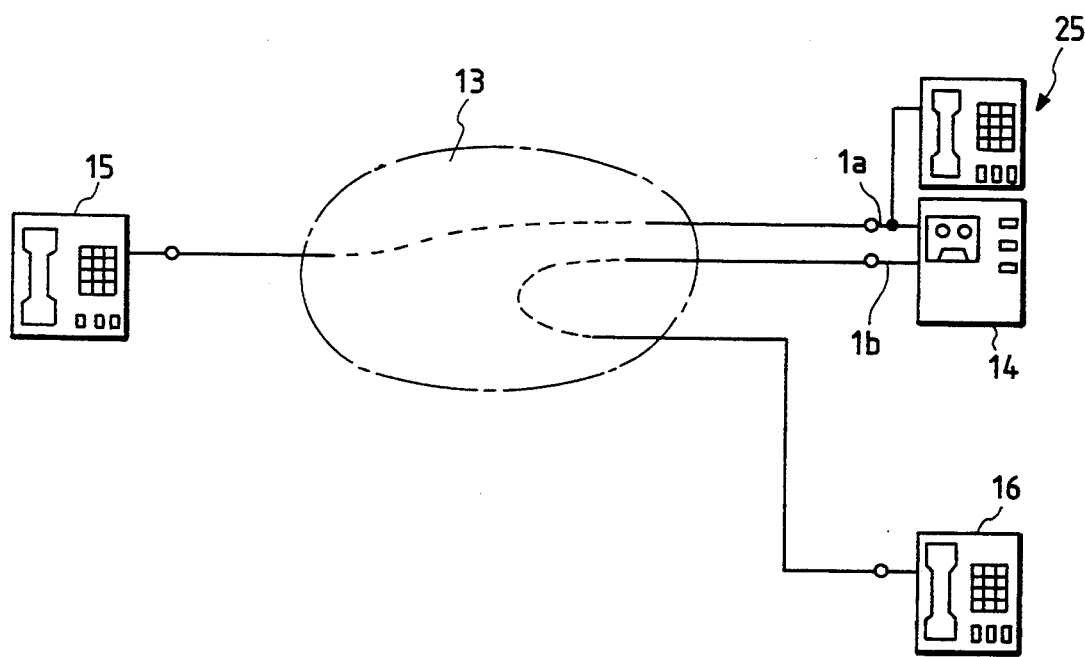
FIG. 4 shows a connection condition of this embodiment of automatic telephone answering apparatus.

FIG. 4 shows the condition mentioned above. It shows a connection condition of this embodiment of automatic telephone answering apparatus 25. In FIG. 4, the caller calls the automatic telephone answering apparatus 25 of this embodiment from a telephone 15. The automatic telephone answering apparatus 25 compares the registered object telephone numbers with the detected telephone number, that is, telephone number of the telephone 15. The automatic telephone answering apparatus 25 does not communicate with the telephone 15 at this phase and calls the registered destination telephone number of the telephone 16. When communication of this automatic telephone answering apparatus 25 with the telephone 16 through another telephone line 1b is established, the automatic telephone answering apparatus 25 connects these telephone line with each other by using the switch circuit 12.

In this state, the termination detection circuit 5a and 5b observe the termination of communication between the automatic telephone answering apparatus 25 and the telephone line 1a and between the apparatus 25 and the telephone line 1b. As mentioned earlier, the microprocessor 10 detects the termination of communication by detecting output signals of the termination detection circuits 5a and 5b in the following step S19. If termination of communication is not detected, processing loops though the steps S18 and S19. When the microprocessor 10 detects termination of either telephone lines 1a and 1b, the microprocessor 10 controls the interface circuit 2a and 2b to open both telephone lines 1a and 1b in the step S20. Then, the microprocessor 10 controls the switch circuit 12 to open the swatches 12a and 12b in the following step S21 as mentioned above.

In the step S12, the Microprocessor 10 checks the busy signal. In the step S14, the decision was made on whether the busy signal is present. If it is present, processing proceeds to the step S22 shown in FIG. 3.

In step S15, the microprocessor 10 checks the timer 9 and then, after thirty seconds has passed, processing also proceeds to the step S22 shown in FIG. 3. In the step S22, the microprocessor 10 controls the interface circuit 2a to cause it to release the telephone line 1b. In the following step S23, the microprocessor 10 controls the interface circuit 2a to cause it to communicate with the telephone line 1a. In the following steps S24 and S25, the microprocessor 10 controls the OGM sending circuit 8b to cause it to send a message to the caller through the telephone line 1a.

The out-going message was previously stored in the DRAM before this automatic answering mode is activated. In the following step S26, the microprocessor 10 controls the ICM recording circuit 8a to record an incoming message from the caller. When the end of the recording of the incoming message is detected in the succeeding step S29, the microprocessor 10 controls the interface circuit 2a to cause it to release the telephone line 1a in the following step S28. Then processing returns to the step S1.

As mentioned above, it is assumed the caller calls this automatic telephone answering apparatus 25 through the telephone line 1a. If the caller calls the user through the telephone line 1b, similar operation is executed in step S7 to S28. That is, that when the caller calls the automatic telephone answering apparatus 25 through the telephone line 1b, processing proceeds from the step S1 to the step S6 and enters a routine starting at a step S29. In the step S29, the microprocessor 10 checks whether or not the telephone line 1a is in use. In this case, the automatic telephone answering apparatus 25 has not communicated with the telephone line called in response to the ring signal.

If the telephone line 1a is not in use, the microprocessor 10 controls the interface circuit 2a to cause it to communicate with the telephone line 1a in the step S30. The microprocessor 10 reads out the destination telephone number stored in the memory 10a and sends it to the dialing circuit 6a. The microprocessor 10 causes the dialing circuit 6a to send a dialing signal of the object telephone number to the telephone line 1a in step S31. In the following step S32, the microprocessor 10 detects the finish of the sending of the destination telephone number. If the end of the sending of the telephone number is detected, the microprocessor 10 sets the timer 9 for the given interval, for example 30 seconds, and starts the timer 9 in the Following step S33. When a ring back signal is detected which should be sent through the telephone line 1a by the line signal detection circuit 7a, the detected signal is sent to the microprocessor 10. In a step S35, the microprocessor 10 detects whether the detected signal is a ring back signal. If the detected signal is the ring back signal, processing proceeds to step S45.

In the step S45, the microprocessor 10 controls the switch circuit 12 to cause it to connect the called telephone line 1a to another telephone line 1b. That is, the microprocessor 10 causes the switches 12a and 12b to be closed. In the following step S46, the microprocessor 10 controls the interface circuit 2b to cause it to communicate with the telephone line 1b. Therefore, this establishes direct communication between the caller on the side of the telephone line 1b and the called user on the side of the telephone line 1a. In the following step S47, the microprocessor 10 observes the telephone lines 1a and 1b. In the succeeding step S48, when the microprocessor 10 detects that either of the telephone lines 1a and 1b ends communication with tills automatic telephone answering apparatus 25, the microprocessor 10 controls the interface circuit 2a and 2b to cause them to release both telephone lines 1a and 1b in a step S49. In the following step S50, the microprocessor 10 controls the switch circuit 12 to cause it to disconnect the telephone line 1a from the telephone line 1b.

In the step S4 shown in FIG. 2, when the obtained telephone line does not agree with any object telephone numbers stored, processing proceeds to the step S51. In time step S51, the microprocessor 10 detects which telephone line is used to call the automatic telephone answering apparatus 25. If the telephone 1a is used, processing proceeds to time step S23 and the microprocessor 10 executes the conventional automatic answering operation shown by steps S23 to S28 mentioned earlier. That is, the microprocessor 10 executes reproduction of the OGM and records an incoming message. If the telephone 1b is used, processing proceeds to the step S39 and the microprocessor 10 executes the conventional automatic answering operation shown by steps S39 to S44. That is, the microprocessor 10 executes reproduction of the OGM and records an incoming message.

In the step S39, the microprocessor 10 controls the interface circuit 2b to cause it to communicate with the telephone line 1b. In the following steps S40 and S41, the microprocessor 10 controls the OGM sending circuit 8b to cause it to send the recorded message, that is, out-going message, to the caller through the telephone line 1b.

The out-going message was previously stored in the DRAM before the entering of this automatic answering mode. In the following step S42, the microprocessor 10 controls the ICM recording circuit 8a to record an incoming message from the caller. When completion of the recording of the incoming message is detected in the succeeding step S43, the microprocessor 10 controls the interface circuit 2b to cause it to release the telephone line 1b in the following step S44. Then processing return to the step S1.

As mentioned above, according to this embodiment, though the user is absent, he can communicate with a specific person whose telephone number has been registered previously because a telephone number sent from the caller is compared with the registered telephone number; when the telephone number of the caller agrees with the registered telephone number the automatic telephone answering apparatus 25 calls the telephone where the user are staying through another telephone line, its telephone number being stored In the automatic telephone answering apparatus 25 previously; and the automatic telephone answering apparatus 25 connects both telephone lines with each other. Therefore, the calls of the telephone equipment of destination where the user is staying is limited, so that a total interval that the telephone line is occupied is reduced. In addition to this, the user can directly communicate with the caller with which the user desires to communicate, by connecting both telephone lines with each other.

In the embodiment motioned above, the automatic telephone answering apparatus 25 is connected to two telephone lines 1a and 1b. However, this embodiment can be applied to an automatic telephone answering apparatus to which more than two telephone lines are connected. Such automatic telephone answering apparatus comprises: N telephone units for communicating with N telephone lines (such as telephone lines 1a and 1b), respectively, wherein N is a natural number, each of N telephone units having: a communication interface circuit (1a, 1b) responsive to a communication control signal for communicating with one of the N telephone lines; a ring signal detection circuit (3a, 3b) for detecting a ring signal from one of the N telephone lines; and a telephone number detection circuit (4a, 4b) for detecting a telephone number sent from a caller's telephone through one of N telephone lines in response to detection of the detected ring signal; a dialing circuit (6a, 6b) for dialing in response a dialing control signal; and a control circuit comprising a microprocessor (10) for executing a stored program such as the program mentioned in this embodiment.

The interval for detection of the ring back signal or the busy signal was assumed to be thirty seconds which is set to the timer 9. However, the interval can be set to a given value.

What is claimed is:
1. A telephone terminal apparatus comprising:
 (a) N communication interface means for communicating with N telephone lines respectively wherein N is a natural number and is more than one:
 (b) ring signal detection means for detecting a ring signal from one of said N telephone lines;
 (c) telephone number detection means responsive to said ring signal detection means for detecting telephone number data indicative of a caller's telephone accompanied with the ring signal detected from said one of said N telephone lines;
 (d) first storing means for storing at least one first telephone number;
 (e) second storing means for storing at least one second telephone number;
 (f) comparing means for comparing said detected telephone number data with said at least one first telephone number;
 (g) control means for communicating with one other telephone line of said N telephone lines and producing a dialing control signal immediately when said detected telephone number data agrees with said at least one first telephone number;
 (h) dialing means for performing dialing using said at least one second telephone number through said one other telephone line in response to said dialing control signal;
 (i) connection means for forming communication passage between said one of said N telephone lines and said one other telephone line and for providing communicating therebetween in response to said control means; and
 (j) second control means for connecting said one of said N telephone lines to said telephone terminal apparatus after said control means communications with said one other telephone line of said N telephone lines and produces said dialing control signal.

2. A telephone terminal apparatus as claimed in claim 1, further comprising:
 (a) message storing means for storing a message to be played to the caller;
 (b) busy signal detection means responsive to said dialing means for detecting a busy signal which may be sent from said one other telephone line in response to said dialing by said dialing means; and
 (c) second control means for selectively sending said message to the caller through said one of N telephone lines when said busy signal detection means detects said busy signal.

3. A telephone terminal apparatus as claimed in claim 1, further comprising:
 (a) message storing means for storing a message to be played to the caller;

(b) first detection means responsive to said dialing for detecting a busy signal which may be sent from said one other telephone line in response to said dialing by said dialing means;
(c) second detection means for detecting a ring back signal sent from said one other telephone line in response to said dialing by said dialing means;
(d) timer means responsive to said dialing for producing a delay signal whose delay time is predetermined; and
(e) second control means responsive to said first and second detection means and said delay signal for selectively sending said message to said caller through said one of N telephone lines when the first detection means detects said busy signal during said delay time or when said second detection means does not detect said ring back signal during said delay time.

4. A telephone terminal apparatus comprising:
(a) N communication interface means for communicating with N telephone lines respectively wherein N is a natural number and is more than one:
(b) ring signal detection means for detecting a ring signal from one of said N telephone lines;
(c) telephone number detection means responsive to said ring signal detection means for detecting telephone number data indicative of a caller's telephone accompanied with the ring signal detected from said one of said N telephone lines;
(d) first storing means for storing at least one first telephone number;
(e) second means for storing at least one second telephone number;
(f) comparing means for comparing said detected telephone number data with said at least one first telephone number;
(g) control means for communicating with one other telephone line of said N telephone lines and producing a dialing control signal immediately when said detected telephone number data agrees with said at least one first telephone number;
(h) dialing means for performing dialing using said at least one second telephone number through said one other telephone line in response to said dialing control signal;
(i) ring back signal detection means responsive to said dialing means for detecting a ring back signal sent from said one other telephone line in response to said dialing by said dialing means;
(j) connection means for forming communication passage between said one of said N telephone lines and said one other telephone line and for providing communicating therebetween when said ring back signal detection means detects said ring back signal; and
(k) second control means for connecting said one of said N telephone lines to said telephone terminal apparatus after said control means communications with said one other telephone line of said N telephone lines and produces said dialing control signal.

5. A telephone terminal apparatus as claimed in claim 4, further comprising:
(a) message storing means for storing a message to be played to the caller;
(b) busy signal detection means responsive to said dialing means for detecting a busy signal which may be sent from said one other telephone line in response to said dialing by said dialing means; and
(c) second control means for selectively sending said message to the caller through said one of N telephone lines when said busy signal detection means detects said busy signal.

6. A telephone terminal apparatus as claimed in claim 4, further comprising:
(a) message storing means for storing a message to be played to the caller;
(b) busy signal detection means responsive to said dialing for detecting a busy signal which may be sent from said one other telephone line in response to said dialing by said dialing means;
(c) timer means responsive to said dialing for producing a delay signal whose delay time is predetermined; and
(d) second control means responsive to said ring back signal detection means and said busy signal detection means and said delay signal for selectively sending said message to said caller through said one of N telephone lines when said busy signal detection means detects said busy signal during said delay time or when said ring back signal detection means does not detect said ring back signal during said delay time.

* * * * *